July 15, 1924.

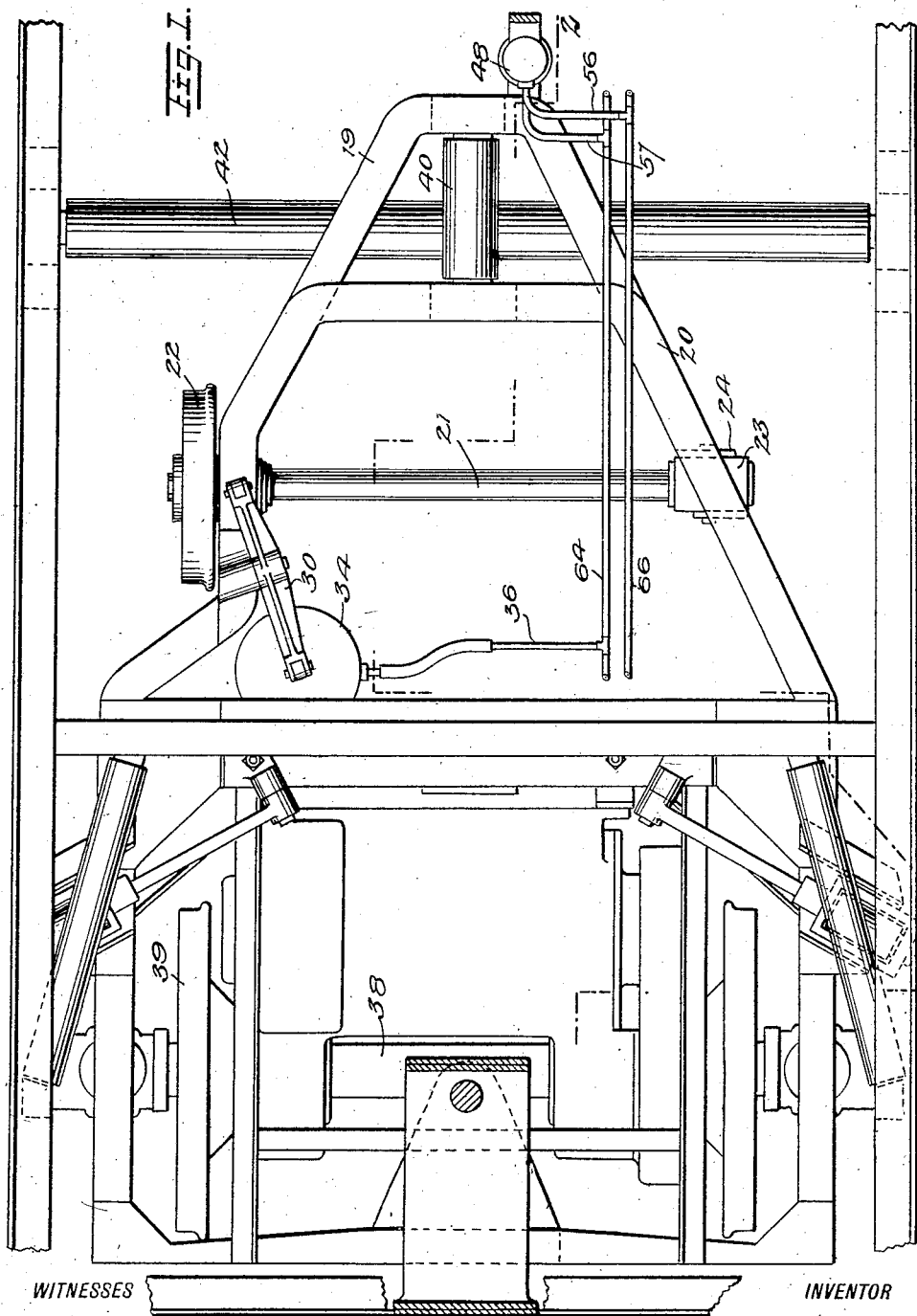

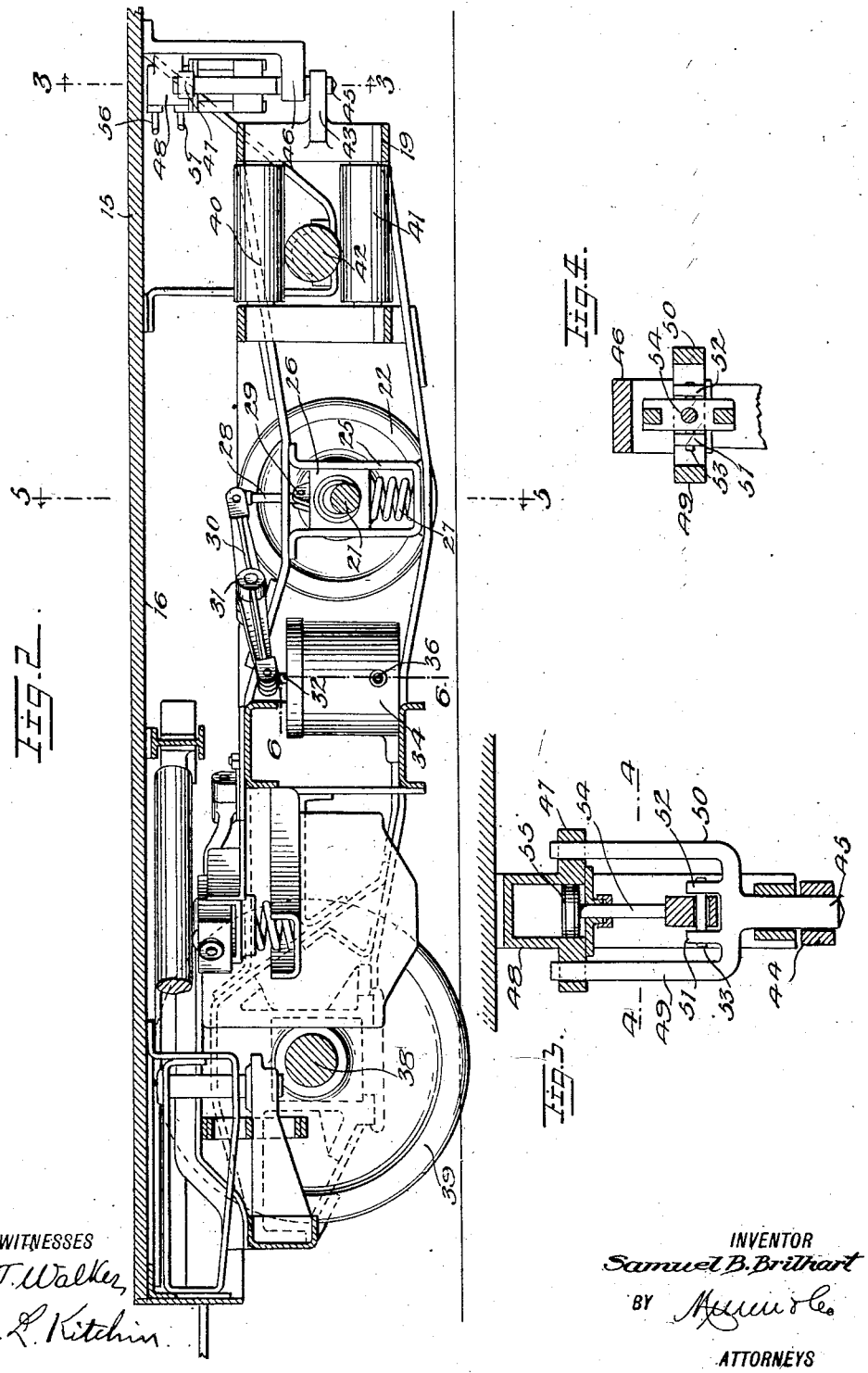

S. B. BRILHART

CAR TRUCK

Filed Nov. 22, 1922

WITNESSES
H. T. Walker
A. L. Kitchin

INVENTOR
Samuel B. Brilhart
BY
ATTORNEYS

July 15, 1924.
S. B. BRILHART
CAR TRUCK
Filed Nov. 22, 1922
1,501,744
4 Sheets-Sheet 4
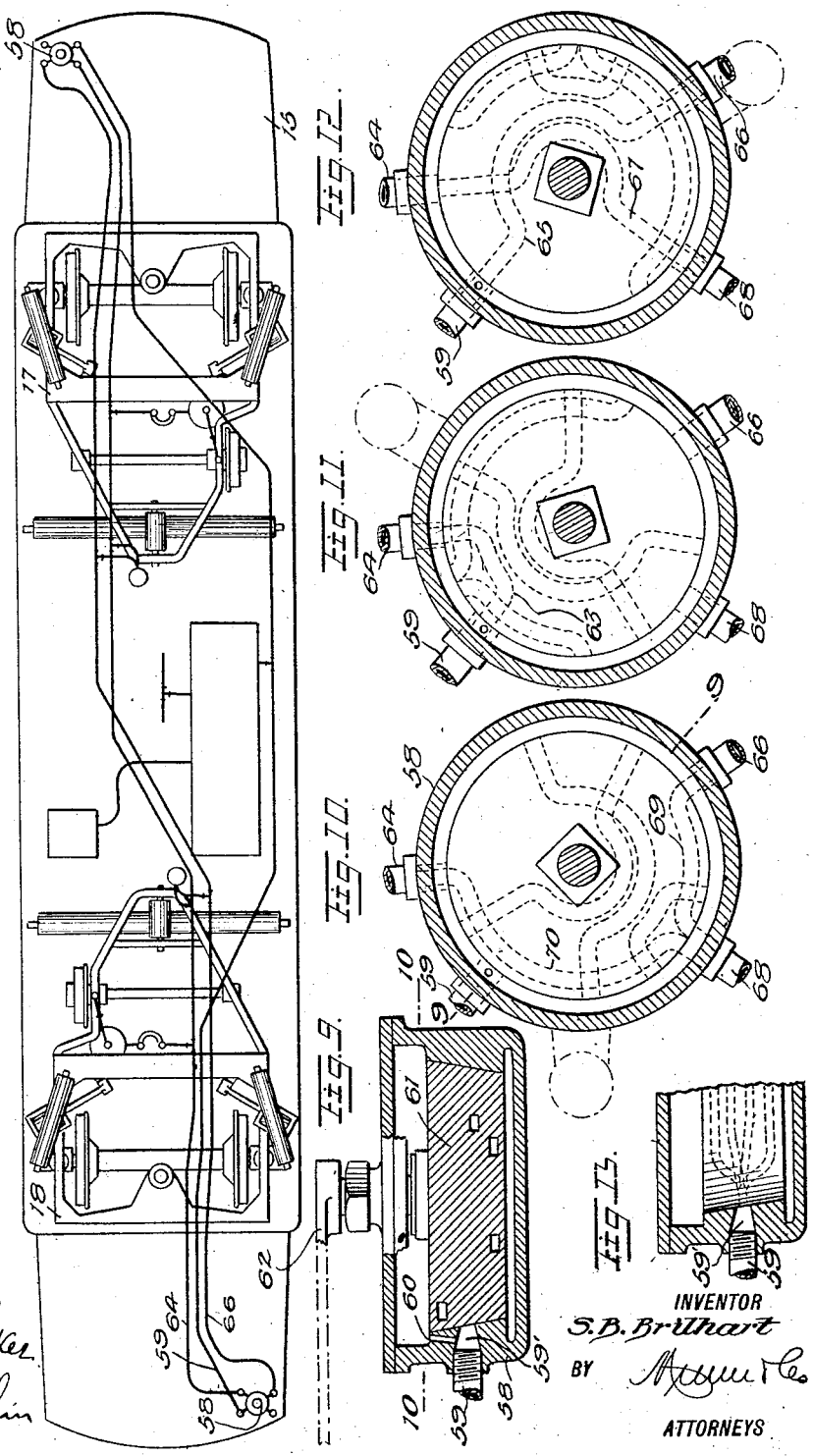

Patented July 15, 1924.

1,501,744

UNITED STATES PATENT OFFICE.

SAMUEL BOWER BRILHART, OF NEW YORK, N. Y.

CAR TRUCK.

Application filed November 22, 1922. Serial No. 602,587.

*To all whom it may concern:*

Be it known that I, SAMUEL B. BRILHART, a citizen of the United States, and a resident of the city of New York, borough of Manhattan, in the county and State of New York, have invented a new and Improved Car Truck, of which the following is a full, clear, and exact description.

This invention relates to rolling stock for railways and particularly to an improved truck of simple construction and of a minimum number of parts. The invention also relates to a control mechanism in connection with a truck whereby parts of a truck may be drawn into and out of operation.

The object of the invention is to provide an improved truck and associated parts which will be effective in operation but which may be manufactured at a comparatively small cost.

Another object of the invention is to provide an improved truck and control therefor whereby the truck may be shifted or manipulated to operate either on a straight track or a curve very efficiently.

A still further object is to reduce the number of wheels, axles, bearings, bearing boxes, springs, brake shoes and various other parts of the brake rigging in connection with the car so as to simplify the construction and at the same time to reduce the wear on the rails at curves.

In the accompanying drawings—

Figure 1 is a top plan view of a truck showing an embodiment of the invention, said view also including certain parts of a car body.

Figure 2 is a longitudinal vertical sectional view through Figure 1 approximately on line 2—2.

Figure 3 is a detail fragmentary sectional view through Figure 2 on line 3—3.

Figure 4 is a fragmentary horizontal sectional view through Figure 3 on line 4—4.

Figure 8 is a bottom plan view of a car with a pair of trucks and suitable connections disclosing one embodiment of the invention.

Figure 9 is a longitudinal vertical section through a control valve embodying certain features of the invention.

Figure 10 is a horizontal sectional view through Figure 9 on line 10—10, showing the parts in an inoperative position.

Figure 11 is a view similar to Figure 10 but showing the parts moved to a position for shifting the guide wheel shown in Figure 5.

Figure 12 is a view similar to Figure 11 but showing the parts moved to a further position wherein the device shown in Figure 6 is operated for raising the guide wheel shown in Figure 5.

Figure 13 is a fragmentary view similar to the left side of Figure 9 but showing the valve plug in elevation with the ports in dots so as to illustrate how they all may register at different times with an inlet pipe.

Figure 5:
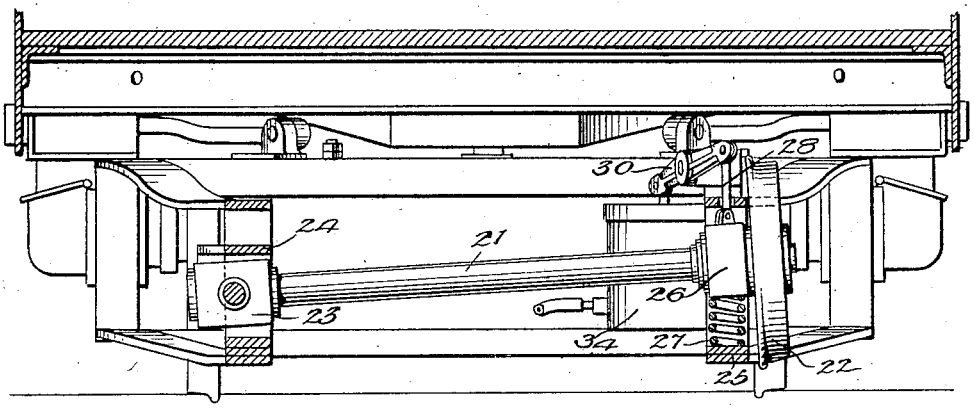
Figure 5 is a transverse sectional view through Figure 2 approximately on line 5—5.

Referring to the accompanying drawings by numeral, 15 indicates the car body which is provided with a floor 16 of any usual construction and which may be provided with any desired fixtures or any desired detail features. The present invention is intended to cover the trucks 17 and 18 and various controlling connection therefor. These trucks are of identical construction so that the description of one will apply to both. It will also be noted that each of the trucks 17 and 18 is pivoted at its rear portion adjacent the axle to the car body, as clearly shown in Figures 1, 2, 5 and 8.

As indicated in Figure 1, the frame 19 of the truck is provided with a substantially A-shaped end 20 which carries a shaft 21 and said shaft in turn carries the controlling or guiding wheel 22. The shaft 21 is journaled in a box 23 of any desired kind which is pivotally supported in a suitable bracket 24 connected in any desired manner to the section 20 of frame 19. At the opposite side of the section 20, a substantially U-shaped bracket 25 is provided (Fig. 2) said bracket accommodating the box 26 in which the shaft 21 is journaled in the usual manner. Preferably, collars are provided on the shaft 21 on the opposite side of box 23 to prevent longitudinal movement of this shaft but to permit it to freely rotate. This shaft is really an axle for the wheel 22 to which it is rigidly secured. The box 26 is continually acted upon by a spring 27 tending to hold the same in an elevated position, said box being assisted by a connecting rod 28 pivotally mounted at 29 to the boxing, said connecting rod 28 being connected to suitable mechanism hereinafter fully described.

Figure 6:
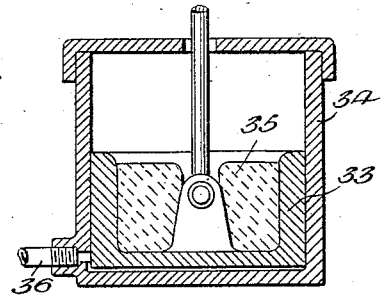
Figure 6 is a fragmentary sectional view through Figure 2 approximately on line 6—6, said section showing the wheel control cylinder and associated parts.

As indicated in Figures 2 and 6, the connecting rod is pivotally connected to a lever or walking beam structure 30 pivotally mounted at 31 on the frame 19 and in turn pivotally connected with the piston rod 32 which piston rod is suitable pivotally connected with the piston 33 and mounted in the cylinder 34. The piston 33 is provided preferably with a filling 35 of lead or other suitable heavy material which assists spring 27 in raising and maintaining elevated the box 26, one end of the axle 21 and the wheel 22. When it is desired to lower this wheel to engage the track, compressed air is admitted to the cylinder through pipe 36 and causes the piston 33 to move upwardly against the action of the weight 35 and the spring 27. It is intended that the wheel 22 be maintained elevated when the car is moving over a straight track and to be lowered when it is about to pass around a curve. It will be noted that each of the trucks is provided with two supporting wheels carried by a single axle and that the entire truck structure is very much simplified.

When the car is moving over a straight track the frame 19 is arranged in proper alignment longitudinally but when a curve is to be passed it is desirable that the axle of the supporting wheels shall remain substantially at right angles to the track at all times and to do this the frame 19 is released so as to freely swing laterally while wheel 22 is caused to engage the track and swing the frame 19 by reason of the engagement of the track so that the axle 38 of the track wheels 39 will be at substantially a right angle to the rails of the track even at a curve. When moving over a straight track, the parts are arranged as shown in Figure 2 with the wheel 22 elevated and with the frame 19 locked against lateral swinging movement. It will be noted that the frame 19 carries longitudinally positioned rollers 40 and 41 co-acting with a transversely positioned roller 42 carried by the car body 15. In this way the end of the frame 19 opposite that connected with the axle 38 is free to swing laterally under some circumstances but cannot swing vertically. A locking tongue 43 extends from the end of frame 19 as shown in Figure 2, said tongue having an aperture 44 arranged therein for receiving the locking bolt 45, said locking bolt being carried and guided by a bracket 46 secured to the car body 15 and by laterally extending apertured arms 47 projecting from the cylinder 48 preferably secured to bracket 46. The locking bolt 45 is provided with a bifurcated structure forming arms 49 and 50 (Fig. 3) which slide through the apertured arms 47 and also with short arms or ears 51 and 52 which carry a pin 53. A piston rod 54 is pivotally mounted on the pin 53 and carries a piston 55 operatively positioned in the cylinder 48. Suitable ports are provided in the cylinder 48 for permitting air from the pipes 56 and 57 to enter or exhaust as the case may be from opposite sides of the piston 55 for raising or lowering the same and, consequently, for raising and lowering the locking bolt 45.

When the car is traveling along a straight track and is approaching a curve, air will be admitted as hereinafter fully described to the pipe 57 whereupon the piston 55 will move upwardly and will move the locking bolt 45 out of engagement with the locking tongue 43. This will permit the frame 19 to move laterally but to prevent any accidental and undesirable lateral movement the wheel 22 is lowered simultaneously with the raising of the bolt 45. Air is admitted through pipe 36 simultaneously with the admission of air through pipe 57 so that the wheel 22 will engage the rail as soon as the bolt 45 has released the truck frame 19. In all street car lines, a grooved rail is placed at the curves and, consequently, the flange of wheel 22 will enter this groove before the actual curve is reached and, consequently, will in a certain sense steer or guide the supporting wheels 39 and the axle 38 so that the axle 38 will remain substantially transversely of the track regardless of the curvature of the track.

In case the construction is to be used on tracks where there is no grooved rail at the curves, the wheel 22 is provided with a flange on each side whereby it may straddle an ordinary rail. As soon as the curve has been passed, pipe 36 and pipe 57 will be opened to the atmosphere and air under pressure is admitted to pipe 56 whereupon piston 55 will be quickly forced downwardly for causing the bolt 45 to move to its lowered position as shown in Figure 2. As the piston 55 moves under pressure, the bolt 45 will move to a lower position before the air in the cylinder 34 can exhaust sufficiently to cause the wheel 22 to disengage the track, though if desired, the cylinder 34 might be exhausted more quickly.

The air to the cylinders 34 and 48 passes through the respective control valves 58 which control valves are operated by the motorman and either one may be operated according to the direction of movement of the car.

In Figures 9 to 13 inclusive, will be seen the valves 58 in section but showing in dotted lines the various passage-ways controlling the air to the cylinders 34 and 48. When the parts are in the position shown in Figure 10, the pipe 59 is connected with any suitable supply of compressed air but cannot operate any of the pistons as none of the parts are in registry with this pipe. As shown in Figures 9 and 13, a by-pass 60 opens into the port 59′ whereby air from pipe 59 may freely enter the upper part of the casing of the valve 58 so as to hold the plug 61 tightly against its seat at all times. This plug is provided with a handle 62 connected up in any desired manner so that the motorman or other operator may freely rotate the plug 61 to secure the desired result. When the train is approaching a curve, handle 62 is rotated until the ports assume the position shown in Figure 11 whereupon air will pass from the pipe 59 through the passage-way 63 in plug 61 and out through the pipe 64 which distributes air to pipes 36 and 57 so that the wheel 22 is lowered simultaneously with the raising of locking bolt 45. Air is maintained in these two cylinders until after the curve has been passed and then the handle 62 is moved to the position shown in Figure 12 whereupon air will pass from the pipe 59 into passage-way 65 and from thence out pipe 66 to the pipe 56 for lowering the bolt 45 and holding the same in a lowered position. Simultaneously with this passage of air for lowering bolt 45, pipes 36 and 57 will exhaust through the pipe 64, passage-way 67 and exhaust pipe 68. If desired, the parts could be left in this position but preferably the handle 62 and associated parts are moved from the position shown in Figure 12 forwardly to the position shown in Figure 10 whereupon the pipes 64 and 66 will both exhaust through the passage-ways 69 and 70 in the plug 61, said passage-ways at this time registering not only with the pipes 64 and 66 but also with the exhaust pipe 68. When the parts have been moved to this position, the air pressure from pipe 59 will be cut off and all the pipes leading to the cylinders 34 and 48 will have been exhausted into the atmosphere. As soon as the air in the cylinder 34 has been exhausted, the weight of the piston therein, the filling 35 and the spring 27 will immediately act to raise the wheel 22 to an elevated position.

Figure 7:
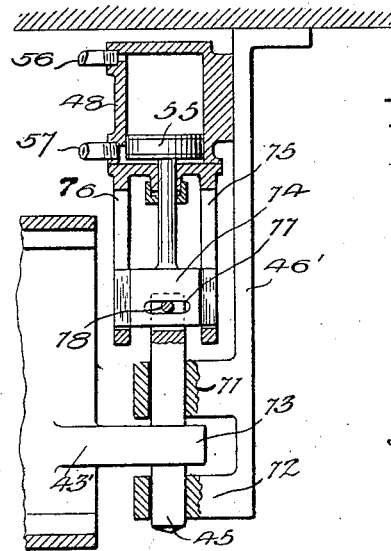
Figure 7 is a view similar to Figure 3 but showing a modified construction.

In Figure 7 will be seen a slightly modified construction to that shown in Figures 2 and 3, said modified structure being in relation to the locking bolt 45. In this form of the invention, the bracket 46′ is provided with a pair of guiding ears 71 and 72 and the tongue 43′ is bifurcated or notched at 73 while the bolt 45 at the upper end is bifurcated and straddles a cross-head 74 which in turn is bifurcated at each end and straddles the respective guiding projections 75 and 76 extending from the cylinder 48. The crosshead 74 is provided with a slot 77 through which the pin 78 projects, said pin being carried by the locking bolt 45. The operation of the locking bolt in this form of the invention is identical to that shown in Figure 3 but the difference in structure being in certain details used in guiding the pin and holding the same in position.

What I claim is:—

1. A car truck, comprising a frame, a supporting axle provided with two supporting wheels, means for mounting the frame on said axle, a steering wheel carried by said frame, means for raising and lowering said steering wheel so as to move the same into and out of engagement with the track, and means for locking said frame against lateral swinging movement.

2. In a truck of the character described, a frame provided with a pair of supporting wheels, a steering wheel, pneumatically operated means for lowering said steering wheel to an operative position, means for raising said wheel as soon as the pneumatic means have been thrown out of action, and means for locking said frame against lateral swinging movement while the steering wheel is elevated.

3. In a truck of the character described, a truck frame, a pair of supporting wheels carried by the frame near one end, a tongue extending from the frame at the opposite end, said tongue having an opening therein, a locking bolt adapted to be carried by the car body supported by the truck, and means for causing said bolt to move into and out of the opening in said tongue for locking and unlocking said frame.

4. In a truck of the character described, a frame, a pair of supporting wheels arranged at one end of the frame, means at the opposite end of the frame for locking the same against lateral swinging movement, said means being operable to release the front of said frame, a steering wheel mounted on said frame near the front, pneumatically actuated means for moving said steering wheel downwardly into operative position, and gravity actuated means for moving the wheel back to an inoperative position.

5. In a truck of the character described, a frame, a steering wheel, an axle for said steering wheel pivotally mounted to one side of said frame, means at the opposite side of said frame for guiding the axle in a vertical movement whereby the axle and steering wheel may be raised and lowered, a piston, means for connecting the piston with said axle for raising and lowering the same, a cylinder co-acting with said piston, means for supplying compressed air to said cylinder for moving the piston, and means acting on the piston for moving the same in the opposite direction.

6. In a truck of the character described, a frame, a vertically movable steering wheel, means including a pivotal bar or walking beam connected with the wheel for raising and lowering the same, pneumatically actuated means for moving said walking beam in one direction, a weight and spring for moving the walking beam and wheel in the opposite direction, and manually operated means for controlling the pneumatic means.

7. In a truck of the character described, a frame, a pair of supporting wheels arranged at one end of the frame, means arranged at the other end of the frame having an opening, a locking bar adapted to be inserted in said opening, means for guiding said bar, and pneumatic means for raising and lowering said bar.

8. In a truck of the character described, a frame, a pair of supporting wheels and connecting axle for supporting one end of the frame, means for supporting the opposite end of the frame consisting of a supporting member carried by the body of the car, and a pair of rollers carried by the frame, one of the rollers of said pair being above and the other below said supporting member, pneumatically actuated locking means engaging the end of the frame carrying said rollers for locking the frame against lateral movement, a vertically movable guiding wheel carried by the frame near said rollers and adapted to be moved into and out of engagement with the rail on which one of the supporting wheels is mounted, manually controlled pneumatic means for lowering said guiding wheel, and means including a weight and a spring for raising said guiding wheel.

SAMUEL BOWER BRILHART.